United States Patent
Bradley et al.

(10) Patent No.: US 8,506,811 B2
(45) Date of Patent: Aug. 13, 2013

(54) PROCESS AND SYSTEM FOR GROWING CRUSTACEANS AND OTHER FISH

(75) Inventors: James E. Bradley, Ladoga, IN (US); Jeremy L. Bradley, Ladoga, IN (US)

(73) Assignee: Bradley Innovation Group, LLC, Ladoga, IN (US)

(*) Notice: Subject to any disclaimer, the term of this patent is extended or adjusted under 35 U.S.C. 154(b) by 473 days.

(21) Appl. No.: 12/724,822

(22) Filed: Mar. 16, 2010

(65) Prior Publication Data

US 2010/0170450 A1 Jul. 8, 2010

Related U.S. Application Data

(63) Continuation-in-part of application No. 12/028,097, filed on Feb. 8, 2008, now Pat. No. 7,682,504.

(60) Provisional application No. 60/904,262, filed on Mar. 1, 2007.

(51) Int. Cl.
*A01K 63/04* (2006.01)
*C02F 3/02* (2006.01)

(52) U.S. Cl.
USPC ............. 210/620; 210/167.22; 119/227

(58) Field of Classification Search
USPC ............ 210/620, 758, 167.21, 67.22, 167.26, 210/167.22; 119/226, 227; 95/246, 247
See application file for complete search history.

(56) References Cited

U.S. PATENT DOCUMENTS

| | | | |
|---|---|---|---|
| 2,275,428 A | 3/1942 | Haldeman | 210/122 |
| 2,293,183 A * | 8/1942 | Walker | 261/93 |
| 2,335,756 A | 11/1943 | Haldeman | 210/122 |
| 3,295,681 A | 1/1967 | Rubert et al. | 210/169 |
| 3,333,834 A | 8/1967 | Brewster | 261/84 |
| 3,499,436 A * | 3/1970 | Balamuth | 601/2 |
| 3,744,635 A | 7/1973 | Horvath | 210/169 |
| 3,796,414 A | 3/1974 | Winton | 261/29 |
| 4,003,832 A | 1/1977 | Henderson et al. | 210/19 |
| 4,086,306 A | 4/1978 | Yoshinaga | 261/93 |
| RE30,038 E | 6/1979 | Sweeney | 119/2 |
| 4,495,891 A | 1/1985 | Dugan et al. | 119/2 |
| 4,559,902 A | 12/1985 | Mason et al. | 119/2 |

(Continued)

FOREIGN PATENT DOCUMENTS

JP 2001-212560 A * 8/2001

OTHER PUBLICATIONS

Machine-generated English translation of JP 2001-212560, dated on Aug. 21, 2012.*

*Primary Examiner* — Fred Prince
(74) *Attorney, Agent, or Firm* — Ice Miller LLP

(57) ABSTRACT

A recirculated marine aquaculture system and process for growing crustaceans or other fish within a body of water. Water from the body of water is treated by stripping carbon dioxide and biological byproducts and by oxygenating the water. A water treatment unit may be provided to treat the water and provide movement to the body water. The water treatment unit can be configured to provide cavitation to the water, which aids in the removal of carbon dioxide and biological byproducts. Water may also be cycled through a deflocculation tank to reduce the floc of bacteria within the body of water to acceptable levels for optimal growth of crustaceans or other fish within a body of water. Using the system and the deflocculation tank has the advantage of significantly reducing the water exchange rates and even the water effluent, while maintaining acceptable water quality for growing crustaceans or other fish.

6 Claims, 7 Drawing Sheets

(56) References Cited

U.S. PATENT DOCUMENTS

| | | | | |
|---|---|---|---|---|
| 5,158,037 | A | 10/1992 | Engelbart | 119/3 |
| 5,178,093 | A | 1/1993 | Reese et al. | 119/3 |
| 5,205,237 | A | 4/1993 | Skeggs et al. | 119/3 |
| 5,294,335 | A | 3/1994 | Chiang | 210/169 |
| 5,397,466 | A | 3/1995 | Lin | 210/170 |
| 5,558,042 | A | 9/1996 | Bradley et al. | 119/226 |
| 5,660,142 | A | 8/1997 | Van Rijn | 119/227 |
| 5,951,922 | A | 9/1999 | Mazzei | 261/36.1 |
| 5,961,831 | A | 10/1999 | Lee et al. | 210/614 |
| 6,041,738 | A | 3/2000 | Hemauer et al. | 119/226 |
| 6,056,873 | A | 5/2000 | Hartley et al. | 210/90 |
| 6,254,769 | B1 | 7/2001 | Whittaker | 210/95 |
| 6,318,292 | B1 | 11/2001 | Sakai | 119/227 |
| 6,447,681 | B1 | 9/2002 | Carlberg et al. | 210/602 |
| 6,499,431 | B1 | 12/2002 | Lin et al. | 119/226 |
| 6,561,134 | B1 | 5/2003 | Mikami | 119/204 |
| 6,584,935 | B2 | 7/2003 | Zohar et al. | 119/204 |
| 6,659,043 | B1 | 12/2003 | Huska | 119/226 |
| 6,722,314 | B1 | 4/2004 | Crisinel et al. | 119/226 |
| 6,764,597 | B2 | 7/2004 | Chauquet | 210/169 |
| 6,818,123 | B2 | 11/2004 | Yano | 210/150 |
| 6,962,019 | B1 | 11/2005 | McDougle | 43/57 |
| 7,024,814 | B1 | 4/2006 | McDougle | 43/57 |
| 7,029,577 | B2 | 4/2006 | Cummins | 210/169 |
| 7,052,601 | B2 | 5/2006 | Gravdal | 210/167 |
| 7,082,893 | B2 | 8/2006 | Schreier | 119/259 |
| 7,100,535 | B2 | 9/2006 | Cattin et al. | 119/245 |
| 7,134,293 | B2 | 11/2006 | Rabal | 62/185 |
| 7,162,831 | B1 | 1/2007 | Morton et al. | 43/57 |
| 7,293,658 | B2 | 11/2007 | Cummins | 210/359 |
| 7,311,833 | B2 * | 12/2007 | Yamamoto et al. | 210/603 |
| 7,624,703 | B2 * | 12/2009 | Vago | 119/215 |
| 2002/0096456 | A1 * | 7/2002 | Kim et al. | 210/90 |
| 2007/0032828 | A1 * | 2/2007 | Vago | 607/2 |
| 2009/0114592 | A1 | 5/2009 | Lebrun et al. | 210/627 |
| 2010/0038320 | A1 * | 2/2010 | Vago | 210/739 |

* cited by examiner

PROCESS AND SYSTEM FOR GROWING CRUSTACEANS AND OTHER FISH

CROSS-REFERENCE TO RELATED APPLICATION

This application is a continuation-in-part of U.S. application Ser. No. 12/028,097, entitled "SYSTEM FOR GROWING CRUSTACEANS AND OTHER FISH," filed Feb. 8, 2008 now U.S. Pat. No. 7,682,504, which is incorporated herein by reference in its entirety, which in turn claims all available benefits of U.S. provisional application Ser. No. 60/904,262 filed Mar. 1, 2007.

BACKGROUND OF THE INVENTION

The present invention relates to aquaculture systems for commercially raising fish, particularly crustaceans including, but not limited to, crayfish, crabs, lobster and shrimp.

In recent years the world has witnessed an alarming decline in commercial fisheries, the result of over fishing and environmental degradation. Over the years, many of the traditional sources for fish, i.e. lakes, rivers, streams, etc., have become contaminated with pollutants generated by the public. As a result, fewer fish are available in such sources; and, in addition, fish that are able to survive in the contaminated waters often themselves become contaminated and unfit for human consumption. According to the Food and Agriculture Organization (FAO) of the United Nations, nearly 70% of the world's commercial marine fisheries species are now fully exploited, overexploited or depleted. Based on anticipated population growth, it is estimated that the world's demand for seafood will double by the year 2025. Therefore, a growing gap is developing between demand and supply of fisheries products, which results in a growing seafood deficit. Even the most favorable estimates project that in the year 2025 the global demand for seafood will be twice as much as the commercial fisheries harvest.

It is very clear that the only way to meet the world's growing needs in fisheries products is through marine aquaculture systems—the farming of aquatic organisms in controlled environments. In response to the situation, global aquaculture production is expanding quickly. Aquaculture's contribution to the world's seafood supplies increased from 12 to 19% between 1984 and 1994. Worldwide, it is estimated that in order to close the increasing gap between demand and supply of aquatic products, aquaculture will need to increase production three-to-four-fold during the next two and a half decades. In this context, there is a compelling motivation to develop aquaculture systems of improved and commercially viable character for high volume production of aquatic species and environmental sustainability.

In an effort to eliminate the effects of marine aquaculture on the environment, and to optimize aquaculture production, an environmentally acceptable aquatic farming technology has emerged: the use of recirculated marine aquaculture systems (RMAS), in which the same water is continuously reused in operation of the system. These systems have many advantages over non-recirculating systems which typically require periodic water exchanges. There are drawbacks to periodic water exchanges; namely, additional water usage, waste material generation that may be adverse to the environment, and an increased cause of stress to the cultured aquatic species. Water re-use in the RMAS minimizes any adverse environmental burden created by the aquaculture system since there is minimal net waste material generation, and what waste is generated is easily handled by local sewer systems, or can be used as fertilizer. RMAS offer flexibility in location options including urban, rural, and inland, since they are not confined to coastal areas or open oceans. Unlike free-floating pens, process conditions can be better controlled within a RMAS. In addition, RMAS minimizes the stress caused to the cultured aquatic species by management of the waste material generation (carbon dioxide, protein, nitrates, nitrites, etc.) and preservation of the floc of beneficial bacteria without breaking the floc. Systems that break the floc of beneficial bacteria must be given additional time and fine tuning to create an effective relative proportion of beneficial bacteria to water.

RMAS typically includes a container containing a large quantity of water in which the fish are raised, and a filtration system for cleaning the water in the container. Such filtration systems typically include a particulate filter and a bio-filter. The particulate filter is used to remove solid particulate materials, such as fish waste and uneaten food, from the water. The bio-filter contains bacteria which removes ammonia and nitrates from the water, and also is used to oxygenate the water. Various types of filters have been used as particulate filters in aquaculture, including rotating drum filters. The use of rotating drum filters in aquaculture, however, has been limited by their high cost, their need for frequent maintenance, and the difficulty in cleaning the filtering surface of the filtering media. The filtering surface must be continuously cleaned to prevent the filtering surface from being clogged by the particulate matter.

In general, aquaculture systems of the prior art are not well designed for use in connection with crustaceans. As a result, the commercial aquaculture systems developed to date are highly variable in efficiency and output of product. Such systems are subject to numerous processing and operational deficiencies, including: sub-optimal production of fish; absence of control of process conditions; process instability; susceptibility to environmental pathogens; susceptibility to pollution; loss of stock; and the lack of well-defined optimal conditions for achieving maximal growth and production of the aquatic species being raised in the aquaculture system.

Despite the various features and benefits of the structures of the prior aquaculture systems, there remains a need for a recirculated marine aquaculture system and process that is specifically designed for crustaceans, including, but not limited to, crayfish, crabs, lobster and shrimp. There remains a specific need for a low-cost system that can grow crustaceans from an early post larval stage to a market ready stage at a well defined time interval that can be repeatedly cycled for optimum return on the system investment.

SUMMARY OF THE INVENTION

These several needs may be satisfied by a recirculated marine aquaculture system and process for growing crustaceans or other fish within a body of water. The RMAS system can include a water treatment unit suspended above, and at least partially submerged, within a body or container of water such as a fisheries tank, pool, pond or lake. A portion of the water is removed from the container in order to be treated by one or more components. Preferably, the water is treated with a single water treatment unit as described herein. The water treatment unit can include a stand pipe with a first propeller adapted to pump a portion of the body of water and a second propeller, elevated above the first propeller, adapted to cavitate water to be treated. The cavitation of water permits the removal of at least one of biological byproducts such as protein and carbon dioxide from the water. During cavitation, a plurality of microbubbles is generated to permit a larger interface between air and water. Dissolved and suspended biological particulates adhere to the surface of the microbubbles and are then removed from the container. The stand pipe can include one or more laterally directed openings positioned above the second propeller. These openings are where through the pumped water flows after cavitation. The openings are elevated above the upper surface of the body of water to allow the water to fall to the upper surface of the body of water, where the water mixes with air drawn into an air inlet of the water treatment unit for oxygenation of the water. Water is then returned to the container.

The body of water can be provided with a floc of beneficial bacteria to break down organic matter, e.g., wastes from the crustaceans or other fish, and convert ammonia into nitrites and nitrites into nitrates. The floc is measured periodically with a measurement device suitable to measure settling solids, such as an Imhoff cone. To reduce the floc of beneficial bacteria to suitable relative proportions for optimal growth of crustaceans or other fish (e.g., 20-40 ppt), without breaking the floc, the RMAS system may also include a deflocculation tank. The body of water of the RMAS can be cycled through the deflocculation tank coupled to the body of water. The deflocculation tank has an inlet for receiving water from the body of water for treatment. The deflocculation tank includes a floor and sidewalls extending upward from the floor to define a cavity that is filled with the body of water to be treated. A first column and/or a second column extend upright within the cavity. The first column has a bottom sealably attached to the floor and a top opening with a passageway extending therebetween. Water is directed from the inlet to the top opening of the first column to flow in a toroidal pattern around the first column for a sufficient period of time to reduce the relative proportion of the floc. The second column is sized to fit within the passageway of the first column in order to define a space between the columns that is capable of receiving water from the body of water after flowing between the area between the inner walls of the tank cavity and the first column. The second column has top and bottom openings with a passageway extending therebetween. The top opening of the second column extends beyond the top opening of the first column, and the bottom opening of the second column is elevated above the bottom of the tank to form a gap for receiving water from the passageway of the first column. A gas bubble source can be positioned within the first column at the bottom of the tank in alignment with the passageway of the second column. The gas bubble source is capable of directing air bubbles in the passageway of the second column in order to lift the water therethrough above at least the top opening of the first column for exiting out of the top opening of the second column. The treated water with a reduced level of floc of bacteria is then returned to the body of water. The flow rates of the return may be maintained to control the period of flow with the tank. In other system embodiments, a RMAS includes the water treatment unit, the deflocculation tank, or various embodiments of both.

Furthermore, several processes are provided herein. In a first process embodiment, a process for growing crustaceans or other fish in a RMAS comprises: housing crustaceans or other fish in a container containing a body of water, having a bottom and a side extending upward to a top edge located above an upper surface of the body of water; removing a portion of the body of water from said container for treatment; cavitating said treatable portion of water to strip at least one of a biological byproduct such as protein and carbon dioxide from said treatable portion of water; mixing said treatable portion of water with air for oxygenation thereof; and returning said treatable portion of water to the body of water within said container. Other aspects include: pumping a portion of said body of water to an elevated position above the upper surface of the body of water for the mixing step; removing a portion of the body of water for reducing a relative proportion of floc of beneficial bacteria in the body of water, and afterwards returning the portion of water to the body of water; maintaining a proportional characteristic of the body of water within a predetermined range, the characteristic including at least one of: temperature in the range of about 80-90° F.; oxygen in the range of about 1-10 ppm; carbon dioxide in the range of less than 15 ppm; ammonia in the range of about 0.1-3 ppm; nitrites in the range of less than 2 ppm; nitrates in the range of about 0.1-20 ppm; salinity in the range of about 5-35 ppt; alkalinity in the range of greater than 150 ppm; pH in the range of about 7-9; and beneficial bacteria in the range of about up to 40 ppt.

In a second process embodiment, a process for reducing a floc of bacteria in a RMAS includes moving a treatable portion of water into the cavity of the deflocculation tank through the inlet of the deflocculation tank, the treatable portion of water having a head pressure, and directing the treatable portion of water from the inlet to the top opening of the first column to flow in a toroidal pattern around the first column within the cavity for a sufficient period of time to reduce the relative proportion of floc of beneficial bacteria. Other steps may include: activating the gas bubble source of the deflocculation tank; moving the treatable portion of water into the passageway of the first column from the top opening to the gap near the bottom opening of the second column; lifting the treatable portion of water through the top opening of the second column; and returning the treatable portion of water to the body of water within the container by movement of the treatable portion of water through the outlet of the deflocculation tank. The flow rate of the treatable portion of water that is returned to the body of water within the container can be maintained between about 5 gpm to about 15 gpm, and the sufficient period of time to reduce the relative proportion of floc of beneficial bacteria can be between about 20 minutes to about 40 minutes. The deflocculation tank can be used as needed or periodically, such as weekly, to reduce the relative proportion of floc of beneficial bacteria in the body of water to about 20 to 40 ppt.

Using various aspects of the system and process has the advantage of reducing the water exchange rates, while maintain acceptable water quality for growing crustaceans optimally. It has been found that the various systems and processes described herein provide a significantly reduced amount of water effluent (about 5-10 gallons per week or about 0.065% to 0.18% for a 5700-7700 gallon container) in the form of the withdrawn foam. This has little to no adverse impact on the environment, as not only is there no further treatment needed for the water effluent before being reintroduced to the environment, but also the withdrawn foam is enriched with protein and organic compounds that can be used as fertilizers in greenhouses or other applications. Other features of the present invention and the corresponding advantages of those features will become apparent from the following discussion of the preferred embodiments of the present invention, exemplifying the best mode of practicing the present invention, which is illustrated in the accompanying drawings. The components in the figures are not necessarily to scale, emphasis instead being placed upon illustrating the principles of the invention. Moreover, in the figures, like referenced numerals designate corresponding parts throughout the different views.

DESCRIPTION OF PREFERRED EMBODIMENTS

Figure 1:
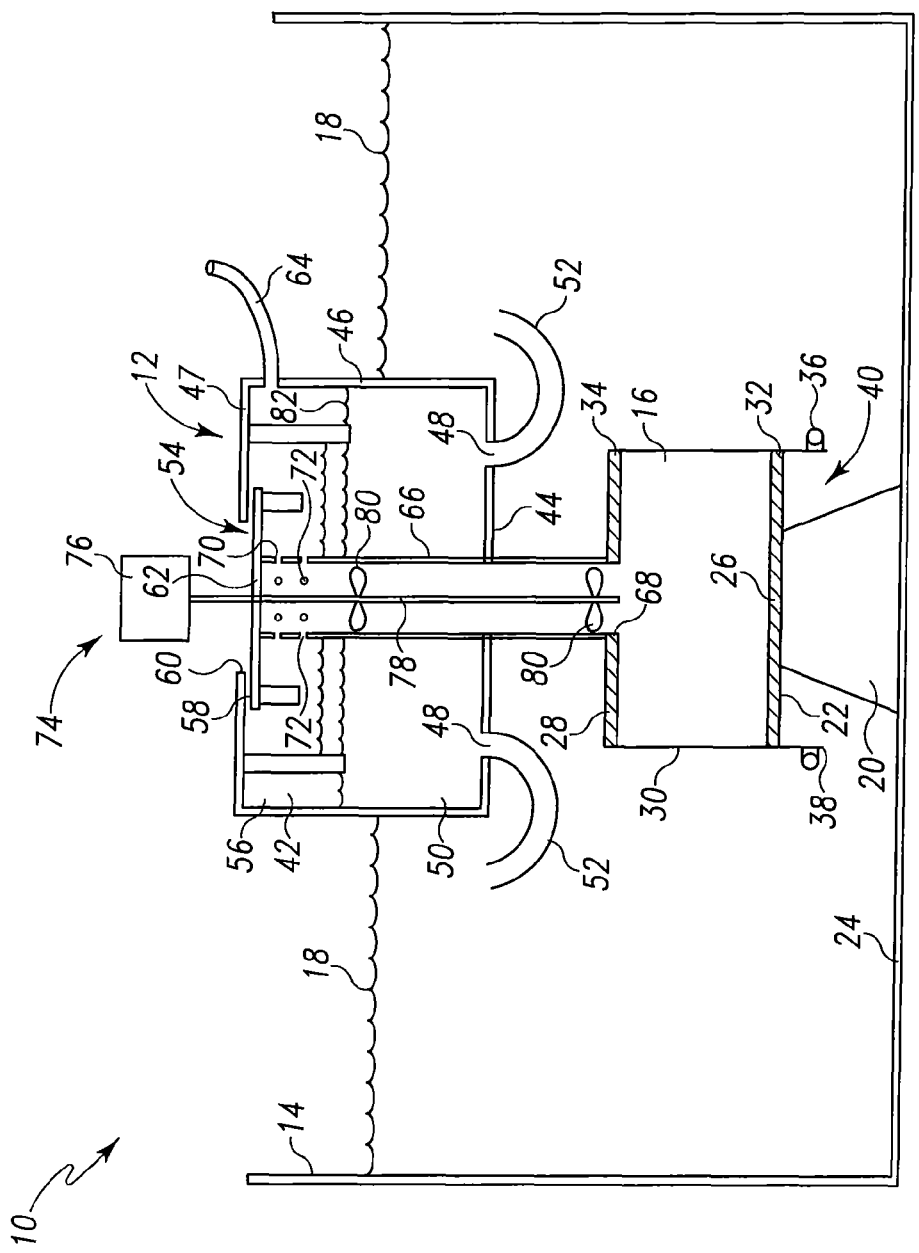
FIG. 1 is a schematic sectional view of a recirculated marine aquaculture system that includes a water treatment unit embodying the present invention.

A first embodiment of a recirculated marine aquaculture system 10 is shown schematically in FIG. 1 that includes a water treatment unit 12 situated within a fisheries tank 14. Preferably, the system 10 is a closed system with suitable recirculation of the tank water that essentially eliminates water exchanges, while maintaining acceptable water quality for optimal growth of aquatic species. The water treatment unit 12 can also be situated in a pool, pond, lake or other body of water with equal effect, and the illustration here of a tank 14 is not intended to be limiting in any way. The water treatment unit 12 has a first chamber 16 that is situated below the water surface 18 in the body of water. A stand 20 can be coupled to a bottom surface 22 of the first chamber 16 to space the first chamber 16 above the bottom 24 of the body of water. The first chamber 16 has a floor 26 and a ceiling 28 which are made of a material that is generally water impenetrable, such as stainless steel or fiberglass reinforced plastic. A filtering wall 30 connects the floor 26 and ceiling 28. The filtering wall 30 permits water to flow from the body of water in the fisheries tank 14 into the first chamber 16. The filtering wall 30 is made of a filtering material that will exclude the desired species of crustaceans or other fish from the first chamber 16, but will permit small particulate materials that may be present in the body of water 14 to pass into the first chamber 16. The filtering material can be a fine screen of stainless steel or a polymer. The filtering wall 30 can be in the form of discrete replaceable panels or in the form of a continuous wall that completely surrounds and connects a perimetral edge 32 of the chamber floor 26 to a perimetral edge 34 of the chamber ceiling 28. A gas bubble source 36 can be situated adjacent to a lower edge 38 of the filtering wall 30 to provide an upward sweeping flow of bubbles that can help maintain the outside of the filtering wall 30 free from litter. The gas bubble source 36 can be supplied by any conventional source of compressed air. The lower edge 38 of the filtering wall 30 can extend below the chamber floor 26 to provide a protected zone 40 under the chamber floor 26 for enhanced microbial activity to break down some of the waste products of any crustaceans or other aquatic species in the body of water 14.

The water treatment unit 12 also includes a second chamber 42 situated above the first chamber 16 as shown schematically in FIG. 1. The second chamber 42 has a base 44, a sidewall 46 extending upward from the base 44, and a top 47 that can be located above the water surface 18 in the tank 14. The second chamber base 44 can be spaced above the first chamber ceiling 28, or can rest directly on the first chamber ceiling 28. The second chamber 42 also has at least one water outlet 48 in a lower portion 50 of the second chamber 42. The water outlet 48 from the second chamber can take the form of one or more outlets 48 through the second chamber base 44. A directionally adjustable pipe 52 can be coupled to the outlet 48 from the second chamber 42 so that the outflow from the second chamber 42 can be used to develop a desired water flow pattern within the body of water 14. An air inlet 54 is provided in an upper portion 56 of the second chamber. The air inlet 54 can be in the form of a lateral slot 58 formed between a central opening 60 in the second chamber top 47 and a plate 62 situated immediately below the central opening 60, but in spaced relation from the second chamber top 47. An outlet 64 can be provided in the second chamber upper portion 56 to allow for withdrawal of excess foam and air enriched in carbon dioxide from the second chamber 42.

The water treatment unit 12 also has a stand pipe 66 coupled between the first chamber 16 and the second chamber 42. The stand pipe 66 has a lower end 68 that opens into the first chamber 16 and an upper opening 70 adjacent to the top 47 of the second chamber 42. The upper opening 70 of the stand pipe 66 can take the form of a plurality of openings 72 that can direct a flow of water laterally adjacent to lateral slot 58. An impeller 74 is connected to the stand pipe 66 to move water from the first chamber 16 up through the stand pipe 66 and out through the upper opening 70 of the stand pipe 66 into the second chamber 42. The impeller 74 can take the form of a motor 76, such as a ¾ HP electric motor, coupled to the stand pipe 66 and a shaft 78 coupled to the motor 76 and to at least one propeller 80 situated within the stand pipe 66 below the water surface 18 in the body of water in the fisheries tank 14. Suitable bearings can be provided between the shaft 78 and the plate 62, as well as at the lower end of the shaft 78 to ensure stability of the rotating shaft 78 with respect to the vertical center of the stand pipe 66. The size of the stand pipe 66, upper opening 70, motor 76, and propellers 80 are desirably selected so that between about 600 to 1000 gallons of water per minute, preferably 800 gpm, can be pumped from the first chamber 16 into the second chamber 42. At this rate, about 0.8 to about 1.4 pounds of oxygen per hour are added to the body of water by the water treatment unit.

Figure 1A:
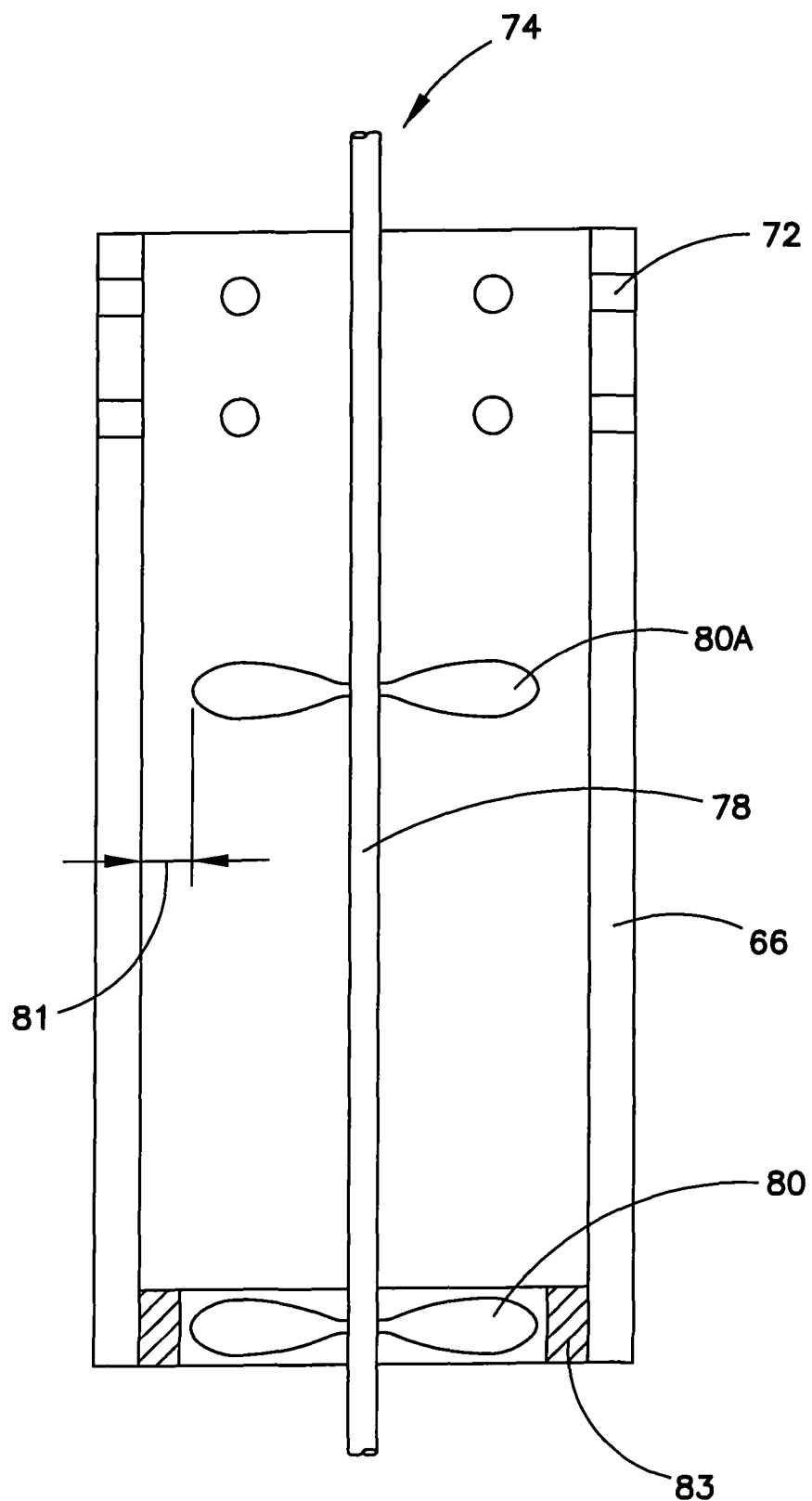
FIG. 1A is a close-up view of an embodiment of propellers of a system impeller used with a water treatment unit.

FIG. 1 shows the tip diameter of the propellers 80 being about the same dimension as the inner diameter of the stand pipe 66. FIG. 1A illustrates a close-up view of an alternative orientation of the propellers 80, 80A. Propeller 80 can be dimensioned and positioned such that the diameter formed by the tips of the blades is slightly less than the inner diameter of the stand pipe 66. Thus, water can enter into the stand pipe 66 through the propeller 80 which is configured to lift the water from the first chamber 16 to the second chamber 42. Although the propeller 80A can also be configured to add lift to the water, preferably the propeller 80A is configured to form cavitation within the stand pipe 66. To this end, the propeller 80A can be then dimensioned and positioned such that the diameter formed by the tips of the blades is substantially less than the diameter of the stand pipe 66, shown as a radial distance 81. This gap thus permits cavitation of the water passing therethrough, which allows for the generation of microbubbles, subsequent growth and collapse of the microbubbles. Dissolved and suspended biological particulates adhere to the surface of the microbubbles and are then carried with the water through the outlet 72 and into the second chamber 42. The water and microbubbles then fall within the second chamber to interface with foam already present in the chamber. Large amounts of interface between the water and air via the microbubbles form a part of foam fractionation where carbon dioxide and biological byproducts, such as protein, is stripped from the water. Portions of the foam can then be removed through the outlet 64. In one example, where the stand pipe has an inner diameter of 8 inches, the propeller 80 has a tip diameter at the tips of the blades of slightly less than 8 inches, and the propeller 80A has a tip diameter that is 20-30% (preferably about 25-27%) less than the inner diameter of the stand pipe 66.

In a preferred embodiment shown in FIG. 1A, a cylindrical ring 83 having outer and inner surfaces has its outer surface attached to the inner surface of the stand pipe 66. Propeller 80 is positioned to be within the cylindrical ring 83 so that the tip diameter of propeller 80 is slightly less than the inner diameter of the cylindrical ring 83. The tip diameter of the propeller 80A can be about 20-30% (preferably about 25-27%) less than the inner diameter of the stand pipe 66. Propeller 80 and propeller 80A can even be the same size, with the radial thickness of the cylindrical ring making up the difference. For example, for a stand pipe having an inner diameter of about 8 inches, the outer diameter of the cylindrical ring is about 8 inches and its inner diameter is about 5⅞ inches (for a radial thickness of about 2⅛ inches), and the tip diameter of both propellers 80, 80A is about 5⅞ inches.

The pumping of water from the first chamber 16 up through the stand pipe 66 causes water to be drawn through the filtering wall 30 into the first chamber 16. The pumping of water from the first chamber 16 into the second chamber 42 through the upper openings 70 causes the water to turbulently mix with air drawn in through the lateral slot 58, thereby increasing the level of oxygen in the water in the second chamber 42. The turbulent mixing also releases some carbon dioxide from the water within the second chamber 42 which can be removed through outlet 64. The pumping of water from the first chamber 16 into the second chamber 42 creates a head represented by the difference in level of the water surface 82 in the second chamber 42 as compared to the water surface 18 in the fisheries tank 14. A small difference in water level can also be observed between the areas inside and outside an inner wall 124. The head within the second chamber 42 forces some of the water in the second chamber 42 out through the water outlets 48 in the lower portion 50 of the second chamber 42. By suitably directing the directionally adjustable pipes 52 the water coming out the water outlets 48 can cause any desired water flow pattern within the fisheries tank 14. An upward flow out of the adjustable pipes 52 can cause a toroidal flow of water within the body of water 14 around the water treatment unit 12, the flow of water being of a volume sufficient to provide a living environment for growing crustaceans or other fish within the body of water 14.

Figure 2:
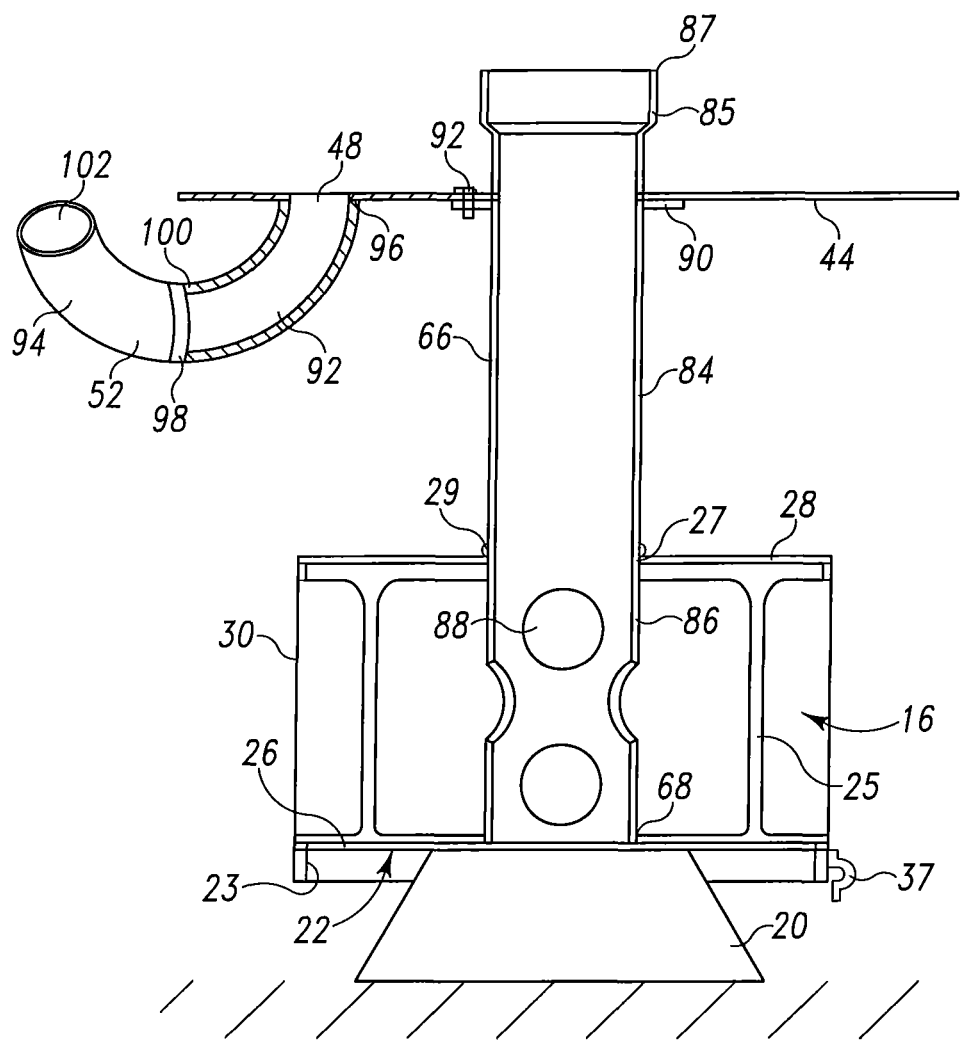
FIG. 2 is an elevation view, partially in section of a portion of a water treatment unit.

Two sub-assemblies of the water treatment unit 12 are shown in FIG. 2. The first chamber 16 of the water treatment unit 12 has the ceiling 28 and the floor 26 connected by vertical ribs 25 that are located on the inside of the screen forming the filtering wall 30. The screen forming the filtering wall 30 can be clamped around the periphery defined by the ceiling 28, floor 26 and vertical ribs 25. The floor 26 also includes a down-turned peripheral flange 23, which in a preferred embodiment extends downward about 5 cm below the floor 26. The gas bubble source 36 can be attached to the peripheral flange 23 using a plurality of brackets or clamps 37 so that the bubble source 36 is situated adjacent to the lower edge 38 of the filtering wall 30. The first chamber 16 of the water treatment unit 12 is shown in section to reveal the stand 20 supporting the bottom surface 22 of floor 26. A lower portion 84 of the stand pipe 66 can be seen to extend downward below the ceiling 28 of the first chamber 16 so that a lower end 68 of the stand pipe 66 rests on the floor 26 of the first chamber 16. The portion 86 of the stand pipe 66 residing within the first chamber 16 includes a plurality of lateral intake openings 88 sized to permit an essentially un-restricted amount of water to flow from the first chamber 16 into the stand pipe 66. A coupling 85 can be provided at the upper end 87 of the lower portion 84 of the stand pipe 66 to facilitate the assembly to additional elements of the water treatment unit 12. A secondary screen can be provided immediately surrounding the stand pipe surface to trap organic debris in the first chamber 16. A high surface area filler can be added to a lower portion of the first chamber 16 to facilitate the digestion of any trapped organic debris.

The base 44 of the second chamber 42 is shown to be coupled to the lower portion 84 of the stand pipe 66 spaced some distance above the ceiling 28 of the first chamber 16. One or more flanges 90 can be cemented, bonded, or otherwise fixed to the stand pipe 66 and one or more fasteners 92 can penetrate the base 44 of the second chamber 42 and the flange 90 to secure the base 44 to the stand pipe 66. Thus, the lower portion 84 of the stand pipe 66 and the base 44 of the second chamber 42 can be handled as a unit to permit easy assembly and disassembly of the water treatment unit 12. In particular, the portion 86 of the stand pipe 66 can slide into and be lifted out of the opening 27 in the ceiling 28 of the first chamber 16 to permit easy assembly and disassembly of the unit 12. A gasket or flange 29 can be situated on the stand pipe 66 to minimize or inhibit any inflow of water into the first chamber 16 at the junction of the ceiling 28 and stand pipe 66, thereby ensuring a proper filtering of the water through the filtering wall 30.

The pipes 52 coupled to the water outlets 48 in the base 44 of the second chamber 42 are shown to comprise a first pipe 92 and a second pipe 94. The first pipe has a first end 96 cemented, bonded, or otherwise fixed to the base 44 to receive water from the outlet 48. The second pipe 94 has a first end 98 coupled to the second end 100 of the first pipe 92, so that the second pipe 94 can be rotated to a desired position relative to the first pipe 92 whereby water exiting the second chamber 42 out through the second end 102 of the second pipe 94 can be variously directed to obtain desirable water current conditions within the body of water 14.

Figure 3:
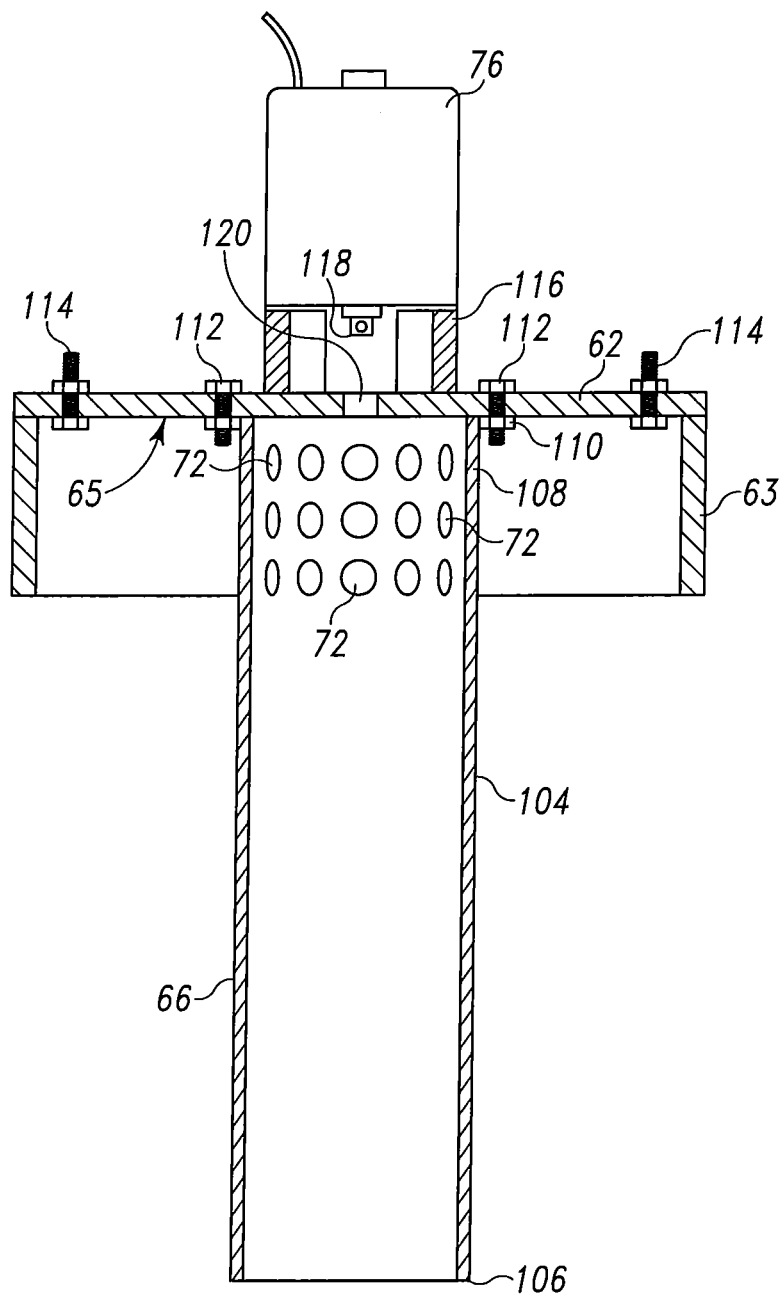
FIG. 3 is an elevation view, partially in section of another portion of a water treatment unit.

A further sub-assembly of the water treatment unit 12 is shown in FIG. 3 that includes an upper portion 104 of the stand pipe 66, which is capped by plate 62. The lower end 106 of the upper portion 104 is intended to be coupled to the coupling 85 at the upper end 87 of the lower portion 84 of the stand pipe 66 shown in FIG. 2. The upper end 108 of the upper portion 104 can include a flange or tabs 110 that can be coupled to the plate 62 by means of fasteners 112. Additional fasteners 114 can be provided to define the size of the lateral slot 58 that creates the air inlet 54 to the second chamber 42 shown in FIG. 1. Arcuate mounting blocks 116 can be provided to mount the motor 76 above the plate 62 by a defined spacing. A coupling 118 can be provided to couple the motor 76 to a shaft 78. A suitable bearing 120 can be mounted to the plate 62 to receive the shaft 78. The openings 72 are seen to comprise three rows of openings that are substantially equally spaced around the upper portion 104 of the stand pipe 66 adjacent to the plate 62. A depending flange 63 can be provided on a lower surface 65 of the plate 62. The depending flange 63 can intercept and downwardly direct water flowing from the openings 72. The downwardly directed water entrains air coming through air inlet 54 to elevate the level of oxygen dissolved in the body of water 14. In a preferred embodiment the depending flange 63 can extending downward about 6 cm from the lower surface 65 of plate 62.

Figure 4:
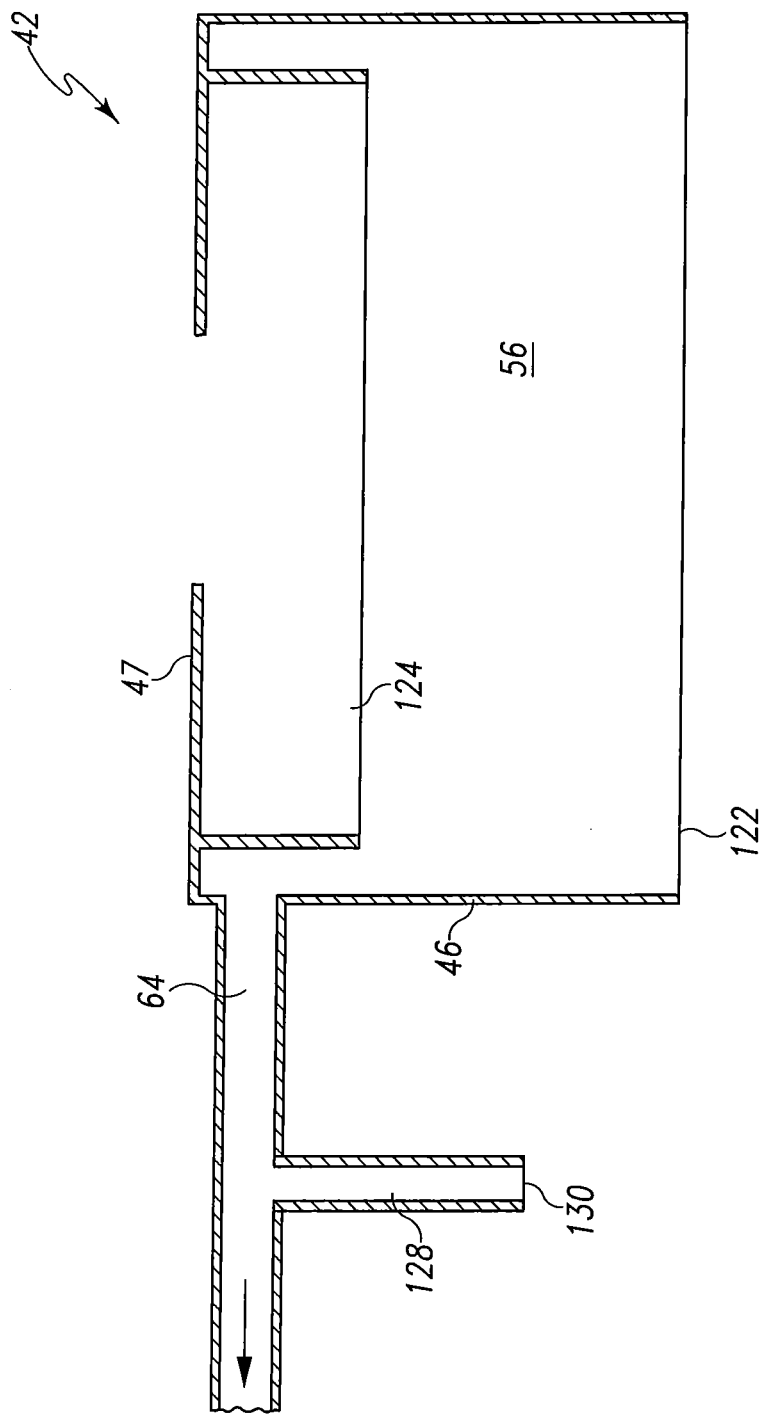
FIG. 4 is a sectional view of another portion of a water treatment unit.

In FIG. 4, a further sub-assembly is shown that consists generally of the sidewall 46 and top 47 of the second chamber 42. The lower edge 122 of the sidewall 46 is intended to fit reasonably snuggly around the perimeter of the base 44 of the first sub-assembly so that water outflow from the second chamber is essentially entirely through the adjustable pipes 52 seen in FIG. 2. An inner wall 124 can be provided that depends from the top 47 generally in a uniformly spaced relation from the sidewall 46. A suitable space between the inner wall 124 and sidewall 46 has been found to be about 5 to 10 cm. The lower edge of the inner wall 124 can be located below the lower edge of the depending flange 63, and in a preferred embodiment can be located 1 to 5 cm below the water surface 82 within the second chamber 42.

Figure 5:
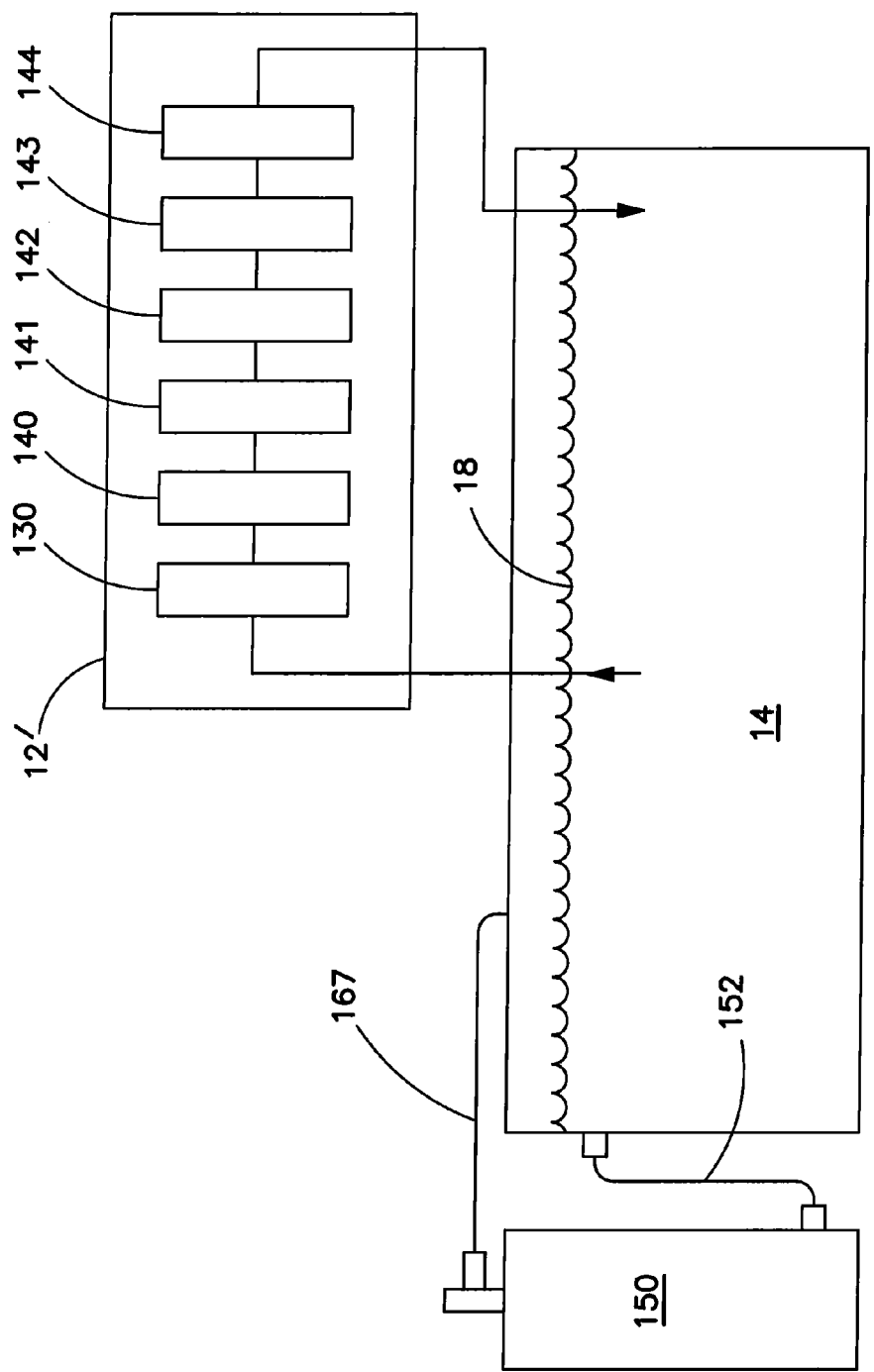
FIG. 5 is a schematic of a recirculated marine aquaculture system that includes a water treatment unit and a deflocculation tank.

A second embodiment of a recirculated marine aquaculture system 110 is shown schematically in FIG. 5 that includes a water treatment unit 12' situated within the fisheries tank 14 and a secondary, deflocculation tank 150. The water treatment unit 12' can perform several functions with individual equipment, even though the water treatment unit 12 alone can be configured to perform all of the functions. To this end, as described in further detail below, the water treatment unit 12' can include features that can perform one or more of the functions.

For example, the water treatment unit 12' can include a filter 130, e.g., the filter 30, to exclude the desired species of crustaceans or other fish from entering into the water treatment unit, but will permit small particulate materials that may be present in the body of water 14 to pass into the water treatment unit for further treatment. A heat source 140, described in greater detail below, may also be associated with the tank in order to heat and maintain the body of water of the tank to a desirable level. A pump source 141, e.g. the impeller 74, is provided to lift the water from the tank through the water treatment unit. A foam fractionation source 142 is provided, e.g., the combination of the cavitational propeller 80A and the bubbles and foam created by the drop of water from the openings 72 elevated from the water level. The carbon dioxide and byproducts in the form of foam can be removed via the outlet 64 that can be aided by a suitable vacuum pump. An aerator 143 is also provided, e.g., the air entrained through the air inlet 54 during the drop of the water from the openings 72. A flow generator 144 is provided, e.g., from the outflow from the conduits 52 of the water treatment unit 12 to develop a desired water flow pattern within the body of water.

The deflocculation tank 150 is configured to reduce the relative proportions of beneficial bacteria in the water, while preserving the floc of beneficial bacteria (i.e., avoiding "breaking" the floc). Crustaceans or other fish produce wastes that break down to create ammonia in water, which is highly toxic to the crustaceans or other fish. Beneficial bacteria can be provided in water to convert ammonia into nitrites and nitrites into nitrates, as well as breaking down organic matter (waste feed and crustacean or fish waste). Thus, one type of bacteria that make of the floc is heterotrophic bacteria that build a colony around some organic or inorganic particle and then breakdown organic matter. A second type of bacteria that make of the floc is nitrifying bacteria that also grow on these colonies. The nitrifying bacteria can include nitrosomonas bacteria one the oxygenated areas of the floc that break down the ammonia into less toxic nitrites, while consuming oxygen that is within the water, and nitrobacter bacteria on the anoxic portions of the floc that break down the nitrites into nitrates, which also consume oxygen in the water. The floc of beneficial bacteria may continue to thrive and grow until reaching undesirable relative proportions, such as, e.g., 20-40 parts-per-thousand (ppt), in which case the relative proportions of beneficial bacteria in the water may be removed preferably without breaking the floc. The floc levels may be measured periodically, such as daily, by use of a device configured to measure settling solids, such as a one-liter Imhoff cone, allowing a period of time, e.g., 15 minutes, of settling before measuring the level of settled solids.

Figure 6:
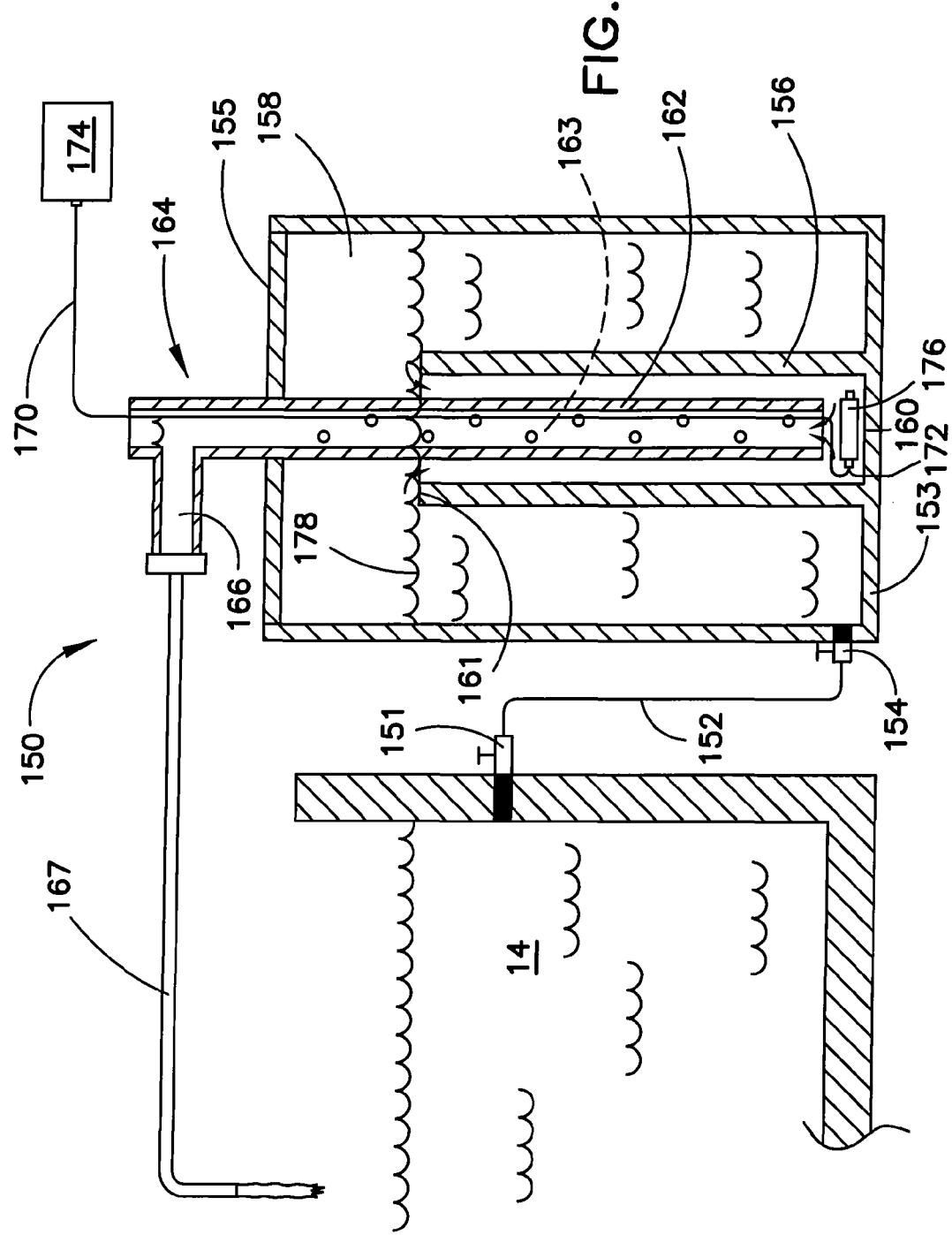
FIG. 6 is a schematic sectional view of a deflocculation tank used with a recirculated marine aquaculture system tank.

FIG. 6 depicts an exemplary way to couple the tank 14 to a preferred embodiment of the deflocculation tank 150. The tank 14 includes fluid outlet 151, such as a tap or spigot, coupled through the wall of the tank 14 for permitting the tank water to drain out. A conduit 152, such as a hose, is coupled between the tank fluid outlet 151 and a fluid inlet 154 in the deflocculation tank 150 such that the fluid outlet 151 and fluid inlet 154 are sealably connected. A first column 156 is cemented, bonded, or otherwise fixed to the bottom of the cavity 158 of the deflocculation tank and extending upright. The bottom 160 of the first column and the bottom 153 of the deflocculation tank 150 are effectively sealed to inhibit water from entering from the bottom. This causes the water to circulate in a flow pattern around the first column 156. The water preferably circulates at a desired flow rate for a desired period of time for treatment before entering from the top 161 of the first column in the spaced defined between the first column 156 and a second column 162. The second column 162 is inserted through the passageway of the first column 156. In one example, the first column 156 is 4-inch PVC pipe and the second column 162 is 2-inch PVC pipe, although it can be appreciated to those skilled in the art that the sizes can vary so long as the inner diameter of the first column is larger than the outer diameter of the second column. The second column 162 extends toward the bottom 160 of the first column 162 but not all the way in order to allow enough space for water to enter therethrough. The second column 162 also extends past the top 161 of the first column 156 and preferably mounts to the top 155 of the deflocculation tank 150, shown cemented, bonded, or otherwise fixed at the center of the deflocculation tank. The top 164 of the second column 162 has a fluid outlet 166 where water exits the deflocculation tank 150 to preferably enter back into the tank 14 via a return conduit 167. A fluid flow meter (not shown) may be associated with the return conduit 167 in order to measure the flow rate of return water through the return conduit. Another port 168 may be associated with the top 164 of the second column 162 for receiving an air conduit 170, such as air tubing, having an outlet 172 that is placed within the first and second columns. The air conduit 170 is preferably attached to a source for compressed air 174.

A gas bubble source 176 may also be located along the bottom 160 of the first column 156; and preferably in alignment with the passageway 163 of the second column 162. The gas bubble source 176 can be an airstone or air diffuser typically used with water and fitted with an air fitting for coupling to the outlet 172 of the air conduit 170. The gas bubble source 176 is configured to diffuse oxygen or air into the tank for oxygenation of the water and to lift the water past the water level 178 into the fluid outlet 166. The pumping action to lift the water above the water surface level in the deflocculation tank 150 should be sufficient to permit the treated water to exit the fluid outlet 166 at a desired flow rate. The return flow rate can be in the range of about 1 gallons-per-minute (gpm) to about 30 gpm; preferably 5-20 gpm; and most preferably 15 gpm. Thus, for a deflocculation tank having a 300-gallon capacity and a return flow rate of 15 gpm, the amount of time for a portion of water to cycle through the deflocculation tank would be 20 minutes. The pressure from the air pump can be increased or decreased accordingly to effectuate the desired flow rate, e.g., the air pressure can be in a range of about 3 pounds-per-square inch (psi) to about 6 psi.

It has been found that the lower flow rates, especially 5-15 gpm, can enhance the preservation of the floc of bacteria. In other words, too low of a flow rate does not sufficiently reduce the relative proportion of floc of bacteria, which leads to more treatment, and too high of a flow rate breaks the floc of bacteria. After a period of operating the deflocculation tank 150, the relative proportion of the beneficial bacteria can be reduced to sufficient levels, e.g., about 20-40 ppt. This can avoid the conventional matter of changing the water completely by draining the "old" water from the tank 14 and filling the tank with "new" water, which can break the existing bacteria flocs. The retention time and the flow rate within the deflocculation tank depends on the relative proportion of the floc of bacteria, and one skilled in the art can determine the time and return flow rate necessary to reduce the relative proportion of the floc to suitable levels for the size of the tank and the deflocculation tank.

For optimal growth of crustaceans or other fish, the water quality of the body of water within the tank is regulated to provide an aquatic environment for optimal growth of the crustaceans or fish. Various aspects of the quality of water can be sensed and regulated, including: temperature, oxygen, carbon dioxide, ammonia, nitrites, nitrates, salinity, alkalinity, pH, bacteria proportions, or the like. Therefore, various means for sampling and sensing the various aspects of the body of water can be provided as appreciated by those skilled in art.

The temperature of the water of the tank 14 may be maintained in the range of about 80° F. to about 90° F., preferably 83° F. to about 87° F., and most preferably 85° F. The water may be heated by a heat source in the form of an external or an internal heat source. For instance, the external heat source can include a convection heat fan unit that applies heated air to the surface of the tank, and the internal heat source can include an electric heater or pipes carrying a heated fluid media from an external water heater within the body of water. For example, the heat source 140 can comprise a water pipe configuration (not shown), such as about 300 feet of pipe in a coiled configuration, located within the first chamber 16 of the water treatment unit such that the water is heated while being pumped through the water treatment unit 12. The pipe configuration is then fluidly coupled to an external water heater (not shown). A thermostat can be associated with the body of water and coupled to the water heater so that the temperature of the water can be controlled by cycling the heater on-off or proportionally changing the temperature of the heater to maintain the temperature within acceptable levels. In some instances, heat generated by operation of the impeller 74 may by sufficient as a primary source of heat or at least sufficient as a supplemental heat source to the heater.

The salinity of the water can also be regulated such that the salt is between 5 ppt to about 35 ppt, preferably from 7 ppt to 25 ppt, and most preferably at 10 ppt, striking a balance between having an acceptable salinity for optimal growth, while minimizing operation costs of maintaining a higher salinity. Additional salt may be added to the water of the tank 14 to increase the salinity; for example, sea salt mix available from Tropic Marin. Alkalinity of the water of the tank 14 may also be regulated to maintain at least 150 parts-per-million (ppm). The pH of the water can be between about 7-9, and preferably about 7-7.5. When the alkalinity of the water is below this threshold, or pH is too high, a sufficient amount of carbonates and/or bicarbonates, such as sodium bicarbonate, can be used to increase the alkalinity of the water to levels above 150 ppm or reduce the pH to acceptable levels.

Other properties of the water of the tank 14 can be sampled periodically to monitor environmental changes. For example, samples of the water can be taken to measure the oxygen, ammonia, and nitrite levels of the water. The oxygen levels can be maintained between about 1 ppm to about 2 ppm and 10 ppm; and preferably maintained in the range between about 5-8 ppm. The ammonia levels can be maintained as high as about 2 ppm to about 3 ppm and as low as 0.1 ppm and preferably maintained at about 0.5 ppm. Similarly, the nitrite levels can be maintained less than 2 ppm, and the nitrate levels can be maintained as high as about 10 ppm to about 20 ppm and as low as 0.1 ppm and preferably maintained at about 0.5 ppm. The various aspects of the quality of water are summarized in Table 1.

TABLE 1

| Water Variable | Range | Preferred |
|---|---|---|
| Temperature | 80-90° F. | 85° F. |
| Oxygen | 1-10 ppm | 5-8 ppm |
| Carbon dioxide | less than 15 ppm | |
| Ammonia | 0.1-3 ppm | 0.5 ppm |
| Nitrites | less than 2 ppm | |
| Nitrates | 0.1-20 ppm | 0.5 ppm |
| Salinity | 5-35 ppt | 10 ppt |
| Alkalinity | greater than 150 ppm | |
| pH | 7-9 | 7-7.5 |
| Bacteria floc | up to 40 ppt | 20 ppt |

During operation, the pumping of water from the second chamber 42 through the upper openings 70 that can cause cavitation before the water turbulently mixes with air drawn in through the lateral slot 58. This not only increases the level of oxygen in the water in the second chamber 42 at about 1.1 pounds of oxygen per hour, but also creates microbubbles to form a body of foam enriched with carbon dioxide and biological byproducts on the water surface 82. The inner wall 124 preferentially traps a significant, and generally dominant, portion of the foam between the inner wall 124 and the sidewall 46. An outlet 64 can be coupled to the space between the inner wall 124 and the sidewall 46 of the second chamber 56 to permit withdrawal of excess foam and air enriched in carbon dioxide from the second chamber 42. The outlet 64 can be aided by a suitable vacuum pump facilitating the withdrawal of the foam and carbon dioxide enriched air through the outlet 64. The outlet 64 can also include a downwardly extending water drain line 128 permitting the return of some of the water separated with the foam to the fisheries tank or other body of water 14. The water drain line 128 preferably extends downward so that a lower end 130 of the water drain line 128 is at least at or below the water surface 18 to ensure an adequate vacuum to facilitate withdrawal of the foam and carbon dioxide enriched air from the second chamber 56 through the outlet 64. It has been found that the various systems and processes described herein provide a significantly reduced amount of water effluent (about 5-10 gallons per week or about 0.065% to 0.18% for a 5700-7700 gallon container) in the form of the withdrawn foam, with the exception of water vaporization. However, the water effluent may even be negligible if returned to the deflocculation tank for cycling back into the body of water. Regardless, the total amount of water exchanges is significantly reduced. Consequently, this has little to no adverse impact on the environment, as not only is there no further treatment needed for the water effluent before being reintroduced to the environment, but also the withdrawn foam is enriched with protein and organic matter and can be used as a fertilizer in greenhouses or other applications.

Periodically, the relative proportions of bacteria will become "thick" or above 40 ppt, in which case the relative amount of bacteria may be too high and adversely affects the oxygen levels of the water and growth of the crustaceans or other fish. To counteract this problem, the deflocculation tank 150 can be arranged adjacent to the tank 14 and the conduit 152 can be fluidly coupled to the two tanks by sealable attachment between the outlet 151 of the tank 14 and the fluid inlet 154 of the deflocculation tank 150. The valve of the outlet 151 can be opened to permit the water of the tank 14 to flow into and fill the deflocculation tank 150. The water level 178 of the deflocculation tank 150 will rise until rising above the height of the first column 156 where water will then fill the passageway of the first column 156. Water within the deflocculation tank 150 should cycle in a flow pattern, such as toroidal pattern, around the first column 156 for a predetermined amount of time and flow rate before entering the second column. Water will also enter into and fill the passageway 163 of the second column 162 as the water fills the first column 156. With the air conduit 170 coupled to the compressed air source 174 and the gas bubble source 176, the air source 174 is turned on and the air pressure is adjusted to operate the gas bubble source 176 such that the desired flow rate of water exiting the fluid outlet 166 of the deflocculation tank 150 is obtained, e.g., 5-15 gpm. Preferably, the water is then returned to the tank 14. This operation can continue to run until the bacteria thins out to an acceptable relative proportion, such as 20-40 ppt, without breaking the floc. The deflocculation tank 150 may also be movable so that it can be fluidly coupled to other tanks.

Example 1

Water is added to an 18-foot diameter tank having 52-inch sidewalls to substantially fill the tank to about 5700-7700 gallons. The water temperature is heated and maintained at about 85° F. Sea salt is added to the water in the tank to increase the salinity to about 10 ppt. The water treatment unit is then activated to begin cycling and moving the water in a toroidal pattern. Generally, the water treatment unit is operated for a period of time sufficient to normalize the environment of the tank water before supplying the crustaceans or other fish. As described previously, the water treatment unit not only sufficiently aerates the tank water, e.g., 1.1 pounds of oxygen per hour, but also strips carbon dioxide and biological byproducts from the tank water and removes them from the system. To increase the growth rate of bacteria, a sufficient amount of ammonia, nitrites and/or nitrates may be added to the tank water. Samples of the tank water are taken to measure various aspects of the quality of water to ensure that the tank water is ideal for growing crustaceans or other fish.

A plurality of shrimp (quantity of about 12,000 to 15,000), with an average weight of about 1 gram, is placed in the tank water. The shrimp are fed several times of day (e.g., 3 times a day) with a sufficient amount of feed typically associated for growing shrimp, such as from Zeigler's Bros., Inc., Gardners, Pa. After 6 to 8 weeks of feeding, the shrimp become market size and ready for shipment, e.g., weighing about 16.7 grams to about 27.3 grams.

During the growth period of the shrimp, water quality is monitored to ensure that the water is sufficient for optimal shrimp growth. In particular, samples of tank water are taken periodically, such as daily, to measure the relative proportions of ammonia, nitrites, and/or nitrates. As described previously, the relative proportions of these are maintained within their ranges. Samples of tank water can also be taken to measure the relative proportions of oxygen, carbon dioxide, salinity, and alkalinity or pH in order for them to be maintained within their ranges. It is preferable that the water quality is maintained within their preferred ranges. It can be appreciated that the water quality can be monitored with equipment and processes suitable for such measurements and adjusted as known in the art.

While these features have been disclosed in connection with the illustrated preferred embodiment, other embodiments of the invention will be apparent to those skilled in the art that come within the spirit of the invention as defined in the following claims. Further, it will be appreciated that in very large ponds or lakes, it may be convenient or necessary to employ two or more water treatment units 12 and/or deflocculation tanks 150 to ensure a total water flow volume sufficient to provide a living environment for growing crustaceans or other fish within the entire body of water.

What is claimed is:

1. A process for growing crustaceans or other fish in a recirculated marine aquaculture system, comprising the steps of:

housing crustaceans or other fish in a container containing a body of water, said container generally having a bottom and a side extending upward to a top edge located above an upper surface of the body of water, said body of water comprising a floc of beneficial bacteria for controlling at least one of organic matter, ammonia, nitrite, and nitrate levels in the body of water;

removing a portion of the body of water from said container for treatment;

cavitating said portion of water to strip at least one of a biological byproduct and carbon dioxide from said portion of water;

mixing said portion of water with air for oxygenation thereof;

returning said portion of water to the body of water within said container;

removing a second portion of the body of water from said container;

moving said second portion of water to a deflocculation tank, the deflocculation tank comprising a floor and sidewalls extending upward from the floor to define a cavity for receiving said second portion of water, an inlet in the sidewall near the floor of the deflocculation tank to receive the second portion of water, an outlet elevated from the inlet to return the second portion of water, a first column extending upright within said cavity, the first column having a bottom and a top opening with a passageway extending therebetween, the bottom of the first column being sealably attached to the floor of the deflocculation tank;

moving the second portion of water into said cavity through said inlet of the deflocculation tank, the second portion of water having a head pressure;

directing the second portion of water from the inlet to the top opening of the first column to flow in a toroidal pattern around the first column within the cavity for a sufficient period of time to reduce the relative proportion of floc of beneficial bacteria; and returning said second portion of water to the body of water within said container.

2. The process of claim 1, wherein the deflocculation tank further comprises a second column extending upright within the passageway of the first column, the second column sized to fit within the passageway of the first column to define a space between the columns, the second column having a top opening and a bottom opening with a passageway extending therebetween, the second column positioned such that second column top opening extends beyond the first column top opening and the second column bottom opening is elevated above the first column bottom to form a gap, the top opening of the second column in communication with the outlet of the deflocculation tank; and a gas bubble source positioned at the bottom of the first column and capable of directing air bubbles in the passageway of the second column, the steps further comprising:

activating the gas bubble source;

moving said second portion of water into the passageway of the first column from the top opening to the gap near the bottom opening of the second column;

lifting said second portion of water through the top opening of the second column;

returning said second portion of water to the body of water within said container by movement of said second portion of water through the outlet of the deflocculation tank.

3. The process of claim 2, wherein said second portion of the body of water is removed from said container periodically to reduce the relative proportion of floc of beneficial bacteria in the body of water to about 20 to 40 ppt.

4. The process of claim 2 further comprising controlling a flow rate of said second portion of water returned to the body of water within said container.

5. The process of claim 1 further comprising maintaining a proportional characteristic of the body of water within a predetermined range, the characteristic including at least one of:

temperature in the range of about 80-90° F.;

oxygen in the range of about 1-10 ppm;

carbon dioxide in the range of less than 15 ppm;

ammonia in the range of about 0.1-3 ppm;

nitrites in the range of less than 2 ppm;

nitrates in the range of about 0.1-20 ppm;

salinity in the range of about 5-35 ppt;

alkalinity in the range of greater than 150 ppm;

pH in the range of about 7-9; and beneficial bacteria in the range of about up to 40 ppt.

6. A process for growing crustaceans or other fish in a recirculated marine aquaculture system, comprising the steps of:

housing crustaceans or other fish in a container containing a body of water, said container generally having a bottom and a side extending upward to a top edge located above an upper surface of the body of water;

removing a portion of the body of water from said container for treatment;

cavitating said portion of water to strip at least one of a biological byproduct and carbon dioxide from said portion of water;

removing the at least one of a biological byproduct and carbon dioxide that is stripped from the body of water from the container;

mixing said portion of water with air for oxygenation thereof;

returning said portion of water to the body of water within said container; and maintaining a proportional characteristic of the body of water within a predetermined range, the characteristic including at least one of temperature, oxygen, carbon dioxide, ammonia, nitrite, nitrate, alkalinity or pH, and salinity;

wherein said removing a portion of the body of water from said container for treatment further is performed by a pump submerged within the body of water to move said treatable portion of water to an elevated position above the upper surface of the body of water, wherein the mixing step is performed upstream of the cavitating step, wherein the cavitating said pumped portion of water step is performed by at least one propeller housed in a stand pipe, the at least one propeller having a tip diameter sized smaller than an inner diameter of the stand pipe, and wherein the removing, cavitating, mixing, and returning steps are performed by a single water treatment unit, the water treatment unit comprising the stand pipe with at least one first propeller adapted to pump said portion of the body of water and at least one second propeller elevated above said at least one first propeller and adapted to cavitate said pumped water, the stand pipe further comprising one or more laterally directed openings positioned above the at least one second propeller, said laterally directed opening adapted to receive and direct the cavitated, pumped water to fall to the upper surface of the body of water, where during the fall of the cavitated, pumped water air is drawn into an air inlet of the water treatment unit to mixed therewith.

\* \* \* \* \*